United States Patent
Rhodes et al.

(10) Patent No.: US 7,626,978 B2
(45) Date of Patent: *Dec. 1, 2009

(54) METHOD FOR DIVERTING AN ISUP TALKPATH TO AN IP TALKPATH

(75) Inventors: Jeffrey Rhodes, Redmond, WA (US); Hong Zhao, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1190 days.

This patent is subject to a terminal disclaimer.

(21) Appl. No.: 10/790,070

(22) Filed: Mar. 2, 2004
(Under 37 CFR 1.47)

(65) Prior Publication Data
US 2004/0165704 A1    Aug. 26, 2004

Related U.S. Application Data

(63) Continuation of application No. 09/628,980, filed on Feb. 11, 2000, now Pat. No. 6,775,270, which is a continuation of application No. 09/326,265, filed on Jun. 7, 1999, now abandoned.

(51) Int. Cl.
H04L 12/66 (2006.01)
H04J 3/24 (2006.01)
H04J 3/00 (2006.01)

(52) U.S. Cl. .................. 370/352; 370/356; 370/473; 370/521

(58) Field of Classification Search ......... 370/352–356, 370/473
See application file for complete search history.

(56) References Cited

U.S. PATENT DOCUMENTS

| | | | |
|---|---|---|---|
| 5,617,423 A | 4/1997 | Li et al. | 370/426 |
| 5,758,256 A * | 5/1998 | Berry et al. | 455/72 |
| 5,764,628 A | 6/1998 | Davis et al. | 370/271 |
| 6,064,653 A * | 5/2000 | Farris | 370/237 |
| 6,122,255 A * | 9/2000 | Bartholomew et al. | 370/237 |
| 6,169,734 B1 * | 1/2001 | Wilson | 370/352 |
| 6,304,565 B1 * | 10/2001 | Ramamurthy | 370/352 |
| 6,377,573 B1 | 4/2002 | Shaffer et al. | 370/356 |
| 6,490,278 B1 | 12/2002 | Michelson et al. | 370/389 |
| 6,570,869 B1 * | 5/2003 | Shankar et al. | 370/352 |
| 6,574,216 B1 | 6/2003 | Farris et al. | 370/352 |
| 6,608,832 B2 | 8/2003 | Forslow | 370/353 |

* cited by examiner

*Primary Examiner*—Seema S. Rao
*Assistant Examiner*—Christine Duong

(57) ABSTRACT

A method for improving the sound quality of voice signals transmitted during a call between two digital wireless telephones by diverting the call from a circuit switched network to a data network is disclosed. In accordance with the present invention, a call setup procedure using the circuit switched network is modified so that the calling party may determine the following information: 1) whether the called party's digital wireless telephone is able to support one of the voice compression algorithms supported by the calling party's digital wireless telephone and 2) whether both wireless telephones have access to the same data network. If the called party's digital wireless telephone is able to support one of the voice compression-algorithms supported by the calling party's digital wireless telephone and both wireless telephones have access to the same data network, the circuit switched network call setup procedure is abandoned before the called party answers the call and the call is completed using the data network. Completing the call by encoding voice signals using a common voice compression algorithm executed by the digital wireless telephones and by sending the encoded voice signals through a data network eliminates the drawbacks associated with the additional intermediate encoding which would have been required if the call had been completed using the circuit switched network.

22 Claims, 3 Drawing Sheets

METHOD FOR DIVERTING AN ISUP TALKPATH TO AN IP TALKPATH

This application is a continuation of application Ser. No. 09/628,980, filed Feb. 11, 2000 now U.S. Pat. No. 6,775,270. Application Ser. No. 09/628,980 is a continuation of application Ser. No. 09/326,265, filed Jun. 7, 1999 and now abandoned.

BACKGROUND

The present invention relates to improving the sound quality of voice signals transmitted during a call between two digital wireless telephones. More particularly, the present invention relates to a method for diverting a wireless telephone call from a circuit switched network to a data network before the call is answered if the called party's digital wireless telephone is able to support one of the voice compression algorithms supported by the calling party's digital wireless telephone and if both digital wireless telephones have access to the same data network.

Currently, many telephone calls from one digital wireless party to another digital wireless party are processed through a circuit switched network such as the public switched telephone network (PSTN). One example of such a telephone call may be illustrated by analyzing the process of completing a telephone call from a wireless party on the east coast of the United States to a wireless party on the west coast.

First, the east coast wireless party dials the west coast wireless party's telephone number using their digital wireless telephone's keypad. When the number is dialed, the east coast party's digital wireless telephone uses a line control signaling technique, such as American National Standards Institute-136 (ANSI-136) to form a call request message. The east coast party's digital wireless telephone then transmits this line control signaling call request message through the air to a cell site (also referred to as a "base station") which serves the geographic region where the east coast party's wireless telephone is currently located and registered. This east coast cell site sends the line control signaling call request message to the east coast party's line/network interface switch (referred to as a "mobile switching center" (MSC) in the context of wireless communication systems) via dedicated circuits.

Next, the east coast MSC uses a network control signaling technique such as Integrated Digital Service Network User Part (ISUP) to reformat the line control signaling call request message into a circuit control signaling call request message and send this circuit control signaling call request message along a "signaling path" of network switches within the PSTN to an MSC on the west coast which is assigned to the west coast party. As the circuit control signaling call request message travels along this "signaling path," various and intermediate network switches contribute a "talkpath" of circuits from the east coast MSC to the west coast MSC. The "talkpath" will be utilized to send voice signals through the PSTN once the call set up is completed.

The west coast MSC, known as the west coast party's home MSC, then queries a home location register (HLR) to determine the MSC currently nearest to the west coast party's digital wireless telephone. If the response to the query indicates the west coast party has roamed to a geographic region covered by a west coast MSC other than the west coast party's home MSC, the home MSC then delivers the circuit control signaling call request message to that MSC. The receiving MSC then continues the process of sending the circuit control signaling call request message to the west coast party. For the purpose of this example, assume the west coast party is currently within the geographic region covered by their home MSC and that the additional step of forwarding the circuit control signaling call request message from the west coast party's home MSC to another west coast MSC is not required.

The west coast party's home MSC uses ANSI-136 line control signaling to reformat the circuit control signaling call request message back to a line control signaling call request message and sends the line control signaling call request message (via dedicated circuits) to a cell site which serves the geographic region where the west coast party's wireless telephone is currently located and registered. This west coast cell site then transmits the line control signaling call request message through the air to the west coast party's wireless telephone. Once the west coast party answers the call to their wireless telephone, both parties can exchange voice information using the "talkpath" of PSTN circuits for the duration of the call.

For example, when the east coast party begins speaking into a microphone attached to their wireless telephone, the east coast party's analog voice signal is compressed by their wireless telephone using a "voice compression algorithm" executed by the cellular telephone. Using a voice compression algorithm to compress the analog voice signal into a low bit rate digital representation conserves the limited bandwidth resources available to wireless communication systems. The east coast party's digital wireless telephone then modulates a carrier frequency with the compressed voice signal and transmits the modulated signal through the air to the east coast cell site. The east coast cell site demodulates the received voice signal and sends the demodulated signal to the east coast MSC which uses a voice compression algorithm to decompress the received voice signal. (Alternatively, decompression may take place at the cell site.) Decompression is needed to make the voice signal compatible with the "talkpath" of circuits. The east coast MSC then performs an intermediate encoding on the decompressed voice signal in accordance with a protocol such as G.711, and sends the G.711 encoded voice signal through the PSTN to the west coast party's home MSC using the previously established "talkpath."

The west coast MSC decodes the G.711 encoded voice signal, compresses the voice signal (using a voice compression algorithm), and sends the compressed voice signal to the west coast cell site. (Alternatively, the compression may take place at the cell site.) The west coast cell site then modulates a carrier frequency with the compressed voice signal and transmits the modulated signal through the air to the intended west coast digital wireless telephone. The west coast digital wireless telephone demodulates the received voice signal and then uses a voice compression algorithm to decompress the received voice signal. The decompressed voice signal is then sent to the digital wireless telephone's speaker for the west coast party to hear. Voice signals transmitted from the west coast wireless telephone party to the east coast wireless telephone party follow the reverse of the above steps.

Unfortunately, there are drawbacks to the above-described method of transmitting voice signals through the PSTN from one digital wireless telephone to another digital wireless telephone. First, the process of completing intermediate voice encoding slightly delays the transmission of the voice signals between the digital wireless telephones. Second, the process of completing intermediate voice encoding may either subject the voice signals to one or more compression/decompression cycles within the circuit switched network or subject the voice signals to voice "enhancements" that otherwise serve analog line telephones much better than digital wireless telephones. Third, decompressing and compressing the same voice signal two or more times while transmitting that voice signal from the sender to the receiver degrades the quality of the voice signal. Finally, the cost of transporting voice signals through the PSTN can be relatively higher than transporting voice signals through a data network such as the Internet.

Thus, a need exists for a technique which solves the above-described problems.

SUMMARY OF THE INVENTION

The present invention provides a method for improving the sound quality of voice signals transmitted during a call between two digital wireless telephones by diverting the call from a circuit switched network to a data network before the call is answered. In accordance with the present invention, a call setup procedure using the circuit switched network is modified so that the calling party may determine the following information: 1) whether the called party's digital wireless telephone is able to support one of the voice compression algorithms supported by the calling party's digital wireless-telephone and 2) whether both wireless telephones have access to the same data network. If the called party's digital wireless telephone is able to support one of the voice compression algorithms supported by the calling party's digital wireless telephone and both wireless telephones have access to the same data network, the circuit switched network call setup procedure is abandoned before the called party answers the call and the call is completed using the data network.

DETAILED DESCRIPTION

The present invention improves the sound quality of voice signals transmitted during a call between two digital wireless telephones by diverting the call from a circuit switched network to a data network before the call is answered if the called party's digital wireless telephone is able to support one of the voice compression algorithms preferred by the calling party's digital wireless telephone and if both digital wireless telephones have access to the same data network (The data network connections should also be able to maintain a quality of service (QoS) sufficient to carry of timely exchanges of voice signals). As a voice signal is transmitted from one digital wireless telephone to another digital wireless telephone through a circuit switched network, the voice signal may be encoded at least twice. First, the voice signal is encoded using a voice compression algorithm executed by the originating digital wireless telephone. The same voice signal may then be encoded in accordance with an intermediate encoding scheme to prepare the voice signal for transmission through the circuit switched network to the recipient digital wireless telephone. Encoding the same voice signal multiple times may delay the transmission of the voice signal, subject the voice signal to enhancements better suited for analog line telephones, and degrade the quality of the voice signal. The present invention eliminates the need for intermediate encoding and the drawbacks associated with intermediate encoding by diverting a call, when possible, from a circuit switched network to a data network before the call is answered.

Figure 1:
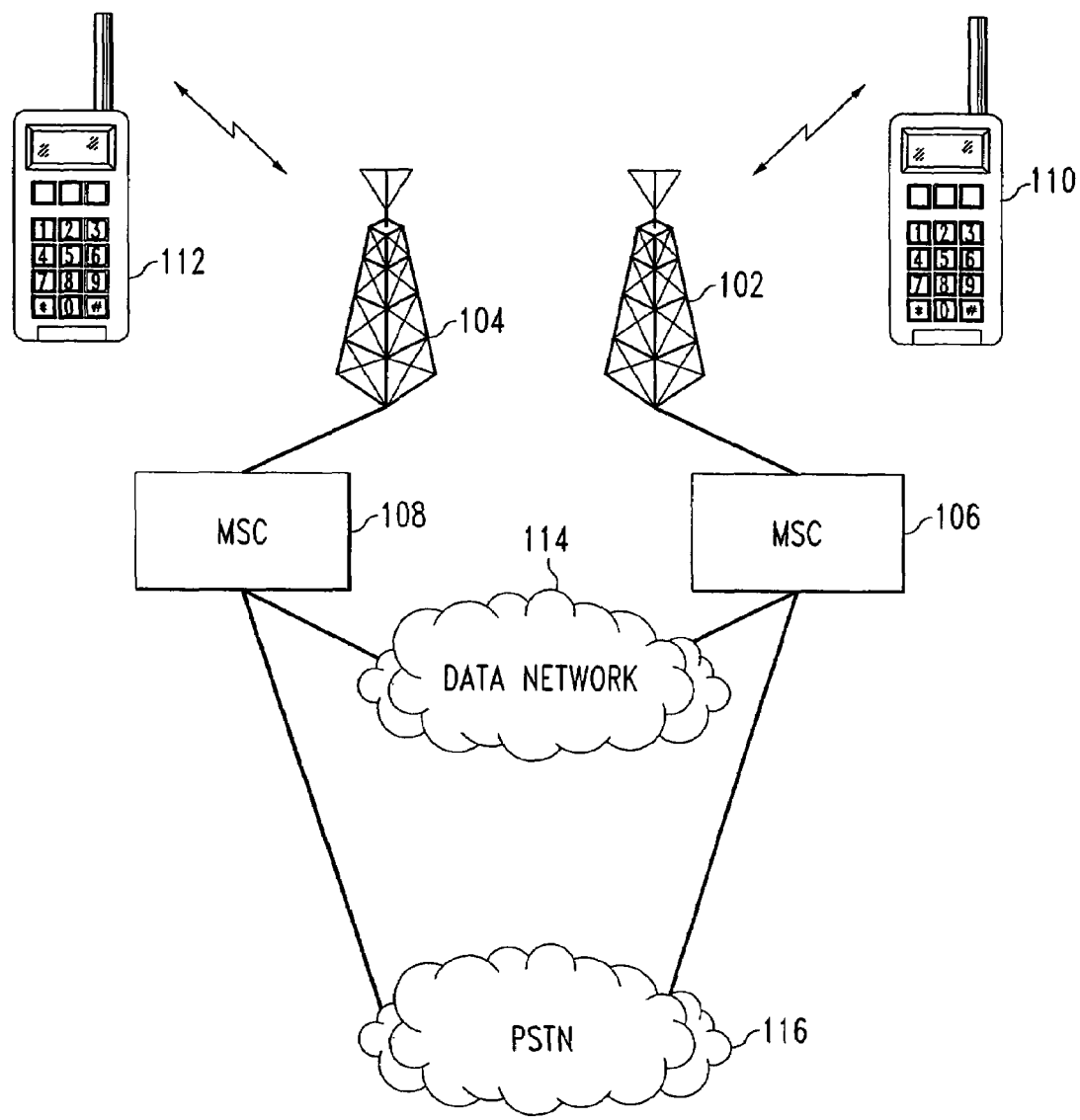
FIG. 1 is a block diagram of a system suitable for practicing an embodiment of the present invention.

FIG. 1 is a block diagram of a system suitable for practicing an embodiment of the present invention. In FIG. 1, two cell sites (also referred to herein as "base stations") 102 and 104 are adapted for two-way wireless communication with digital wireless telephones within the geographic region respectively covered by each base station. Two digital wireless telephones 110 and 112 are within the geographic regions respectively covered by base station 102 and base station 104. Each of digital wireless telephones 110 and 112 is adapted for two-way communication with the base station having a foot print that includes the current location of these digital wireless telephones. Each digital wireless telephone may be, for example, an Ericsson DH318.

Base station 102 is adapted to be connected to a line/network interface switch (referred to as a mobile switching center (MSC) within the context of wireless communication systems) 106 and base station 104 is adapted to be connected to an MSC 108. MSC 106 and MSC 108 are both known devices modified in accordance with the present invention. These modifications will be discussed in greater detail below with reference to FIG. 2. Both MSC 106 and MSC 108 are each adapted to be connected to a data network 114 and a public switched telephone network (PSTN) 116. MSC 106 and MSC 108 need not be in the same wireless network. Data network 114 may be an Internet protocol (IP) network such as the Internet. Although the embodiment of FIG. 1 includes two base stations, two digital wireless telephones, and two MSCs; the present invention is intended for use within systems which include a greater or lesser number of each of these elements.

An MSC is a known device which connects mobile units (such as digital wireless telephones) and base stations to the PSTN. The MSC also makes connections from the digital wireless telephones to called parties through the PSTN. The process of making connections to called parties through the PSTN may be accomplished using a network control signaling technique as described above. Typical known MSCs comprise, among other components, a processor used to execute computer program code segments (software) stored within a computer readable segment of memory. Thus, an MSC may implement a network control signaling technique to make connections to called parties through the PSTN by using a processor to execute network control signaling software stored within a computer readable memory segment.

Figure 2:
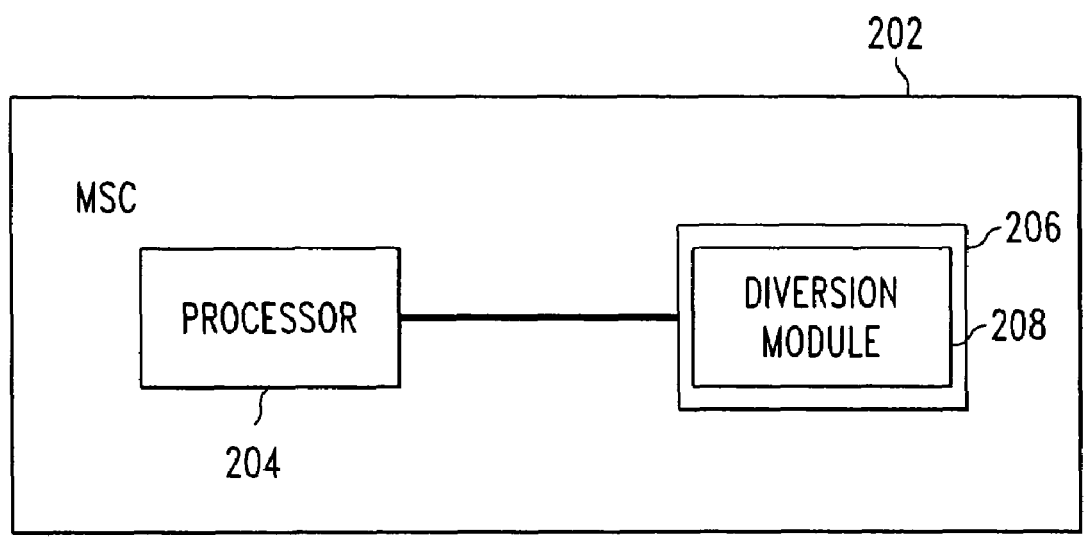
FIG. 2 is a block diagram of a mobile switching center (MSC) in accordance with an embodiment of the present invention.

One example of a method according to the present invention is implemented by modifying known network control signaling software within one or more MSCs. FIG. 2 is a block diagram of an MSC in accordance with an embodiment of the present invention. In FIG. 2, an MSC 202 comprises a processor 204 adapted to be connected to a computer readable memory segment 206. Computer readable memory segment 206 stores computer program code segments which, when executed by processor 204, implement the main functionality of this embodiment of the invention. These computer program code segments modify known network control signaling software and are stored within a diversion module 208. Although in this embodiment of the invention, the computer program code segments are shown in one module, it can be appreciated that this module can be further separated into more modules and still fall within the scope of the invention. The operation of diversion module 208 will be described below with reference to FIG. 3.

Figure 3:
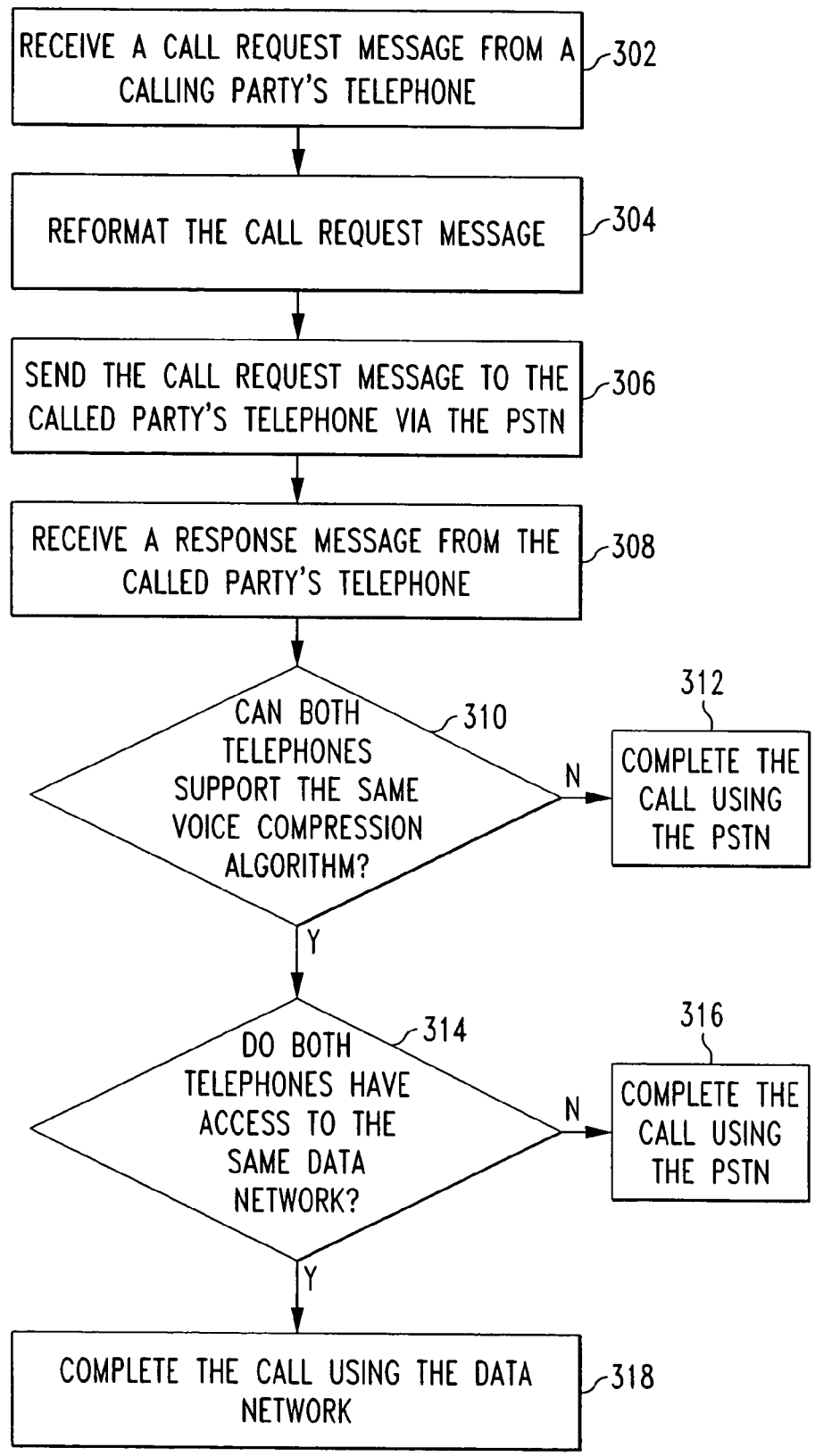
FIG. 3 illustrates a flow chart with steps for diverting a call from a circuit switched network to a data network in accordance with an embodiment of the present invention.

FIG. 3 illustrates a flow chart with steps for diverting a call from a circuit switched network to a data network in accordance with an embodiment of the present invention. These steps may be implemented, for example, as a computer program or as computer hardware using well-known signal processing techniques. If implemented in software, the computer program instructions are stored in computer readable memory, such as Read-Only Memory (ROM), Random Access Memory (RAM), magnetic disk (e.g., 3.5" diskette or hard drive), optical disk (e.g., CD-ROM) and so forth. In accordance with one embodiment of the present invention, the computer program instructions are included within a diversion module 208 and executed by processor 204 within MSC 106 or MSC 108.

An example of a method in accordance with the present invention may be illustrated within the context of the above-described scenario in which an east coast wireless party wishes to complete a telephone call to a west coast wireless party. Suppose the east coast wireless party's digital wireless telephone, base station and MSC of the above scenario are respectively represented by digital wireless telephone 110, base station 102 and MSC 106 of FIG. 1. Further, suppose the west coast wireless party's digital wireless telephone, base station and MSC of the above scenario are respectively represented by digital wireless telephone 112, base station 104 and MSC 108 of FIG. 1. Also for the purpose of this example, assume MSC 106 has been assigned one or more IP address/port number pairs which (in general terms) represent connection points MSC 106 may use to communicate with other devices which have access to data network 114. Thus, digital wireless telephone 110 has access to data network 114 via the IP address/port number pairs assigned to MSC 106. In addition, suppose the steps illustrated in the flow chart of FIG. 3 are executed within MSC 106.

In step 302 of FIG. 3, MSC 106 receives the line control signaling call request message which the east coast wireless party originated by dialing the west coast wireless party's telephone number using digital wireless telephone 110. This received line control signaling call request message may include, for example, a list of voice compression algorithms which may be supported by digital wireless telephone 110. Upon receiving this call request message (including the list of voice compression algorithms) from digital wireless telephone 110, MSC 106 assigns each voice compression algorithm to an IP address/port number pair. In an alternative embodiment of the present invention, digital wireless telephone 110 may assign each voice compression algorithm to an IP address/port number pair and include this information in the line control signaling call request message sent to MSC 106.

In step 304, MSC 106 reformats the received line control signaling call request message into a circuit control signaling call request message. This step entails modifying circuit control signaling call request messages currently generated using known network control signaling techniques to include the voice compression algorithm, IP address, and port number information.

In step 306, MSC 106 sends the circuit control signaling call request message to digital wireless telephone 112 via PSTN 116, MSC 108, and base station 104 as described above. In step 308, the MSC receives a response message from digital wireless telephone 112 via PSTN 116. The response message indicates whether digital wireless telephone 112 can support one of the voice compression algorithms on the list received from digital wireless telephone 110. The response message also indicates whether digital wireless telephone 112 has access to data network 114. In step 310, MSC 106 determines whether the response message indicates both wireless telephones can support the same voice compression algorithm.

If, in step 310, both wireless telephones are able to support the same voice compression algorithm, MSC 106 proceeds to step 314. If, in step 310, the response message indicates digital wireless telephone 112 is not able to support any of the voice compression algorithms identified by digital wireless telephone 110, MSC 106 proceeds to step 312 and continues the above-described process of completing the call set-up using PSTN 116.

In step 314, MSC 106 determines whether the response message received from digital wireless telephone 112 indicates both wireless telephones have access to data network 114. If MSC 106 determines digital wireless telephone 112 does not have access to data network 114, MSC 106 proceeds to step 316 and continues the above-described process of completing the call using PSTN 116. If MSC 106 determines both wireless telephones have access to data network 114, MSC 106 proceeds to step 318. In step 318, MSC 106 abandons the PSTN 116 call set up procedure before the west coast party answers the telephone call and completes the call set-up using data network 114.

If, after completing the steps illustrated in the flow chart of FIG. 3, a determination is made that both digital wireless telephones can support the same voice compression algorithm and that both digital wireless telephones have access to data network 114, digital wireless telephone 110 and digital wireless telephone 112 may exchange voice signals via data network 114. The exchanged voice signals are encoded only once without the additional intermediate encoding which would have been required if the voice signals had been exchanged using PSTN 116. The east coast party's voice signals are thus encoded by digital wireless telephone 110 using the agreed upon voice compression algorithm; sent to digital wireless telephone 112 via base station 102, MSC 106, data network 114, MSC 108, and base station 104; and decompressed by digital wireless telephone 112 using the agreed upon voice compression algorithm. The west coast party's voice signals follow the reverse of this process.

Another advantage of exchanging voice signals between two wireless telephones in accordance with the present invention relates to the a concept commonly referred to as "path minimization." When two wireless telephones exchange voice signals using a circuit switched network, the voice signals pass through the circuit switched network regardless of where the two wireless telephones are located during the call. Thus, even if the two wireless telephones are currently within the same geographic region serviced by the same base station, voice signals between these two wireless telephones take the following path: from one of the wireless telephones to the base station, through the circuit switched network talkpath, back to the same base station, and then to the other wireless telephone. In accordance with the present invention, if two wireless telephones are utilizing the same base station, the circuit switched network talkpath is eliminated and the exchanged voice signals may follow a path from one wireless telephone to the previously selected IP address/port number pair assigned to the common base station and from the common base station to the other wireless telephone.

In another embodiment of the present invention, MSC 106 may make the determination of step 310 by checking for a separate response message from digital wireless telephone 112 at one of the IP address/port number pairs identified in the circuit control signaling call request message MSC 106 sent to digital wireless telephone 112-rather than using the response message received from digital wireless telephone 112 via the PSTN. In this embodiment, wireless telephone 112 and/or MSC 108 select(s) one of the voice compression algorithm choices received from digital wireless telephone110 by executing steps to connect (via data network 114) to the IP address/port number pair assigned to the selected voice compression algorithm. If MSC 106 fails to receive a response message from digital wireless telephone 112 at any of the identified IP address/port number pairs, this indicates digital wireless telephone 112 is unable to support any of the voice compression algorithms supported by digital wireless telephone 110.

In another embodiment of the present invention, MSC 106 (rather than digital wireless telephone 110) is the source of information indicating which voice compression algorithms are supported by digital wireless telephone 110.

In yet another embodiment of the present invention, the response message received by MSC 106 in step 308 is generated by MSC 108, or MSC 108 in conjunction with a home location register (HLR) which stores compression information for wireless telephones, or an HLR after MSC 108 receives the circuit control signaling call request message from MSC 106. In this embodiment, MSC 108 stores information regarding voice compression algorithms supported by digital wireless telephone 112 and is thus able to respond to the incoming message (from MSC 106) requesting this information without sending this incoming message to digital wireless telephone 112. In this embodiment, MSC 108 sends either a selected voice compression algorithm or a list of voice compression algorithms which match the voice compression algorithm choices received from either the calling party's digital wireless telephone or the calling party's MSC. In the case where MSC 106 responds with a list of voice compression algorithms, either the calling party's digital. wireless telephone or the calling party's MSC may make the final decision on which voice compression algorithm should be used by the two digital wireless telephones. This decision may be made, for example, by contacting the appropriate IP address/port number pair.

Although several embodiments are specifically illustrated herein, it will be appreciated that modifications and variations of the present invention are covered by the above teachings and within the purview of the appended claims without departing from the spirit and intended scope of the invention. For example, although the method of the present invention is described in the context of wireless telephones, the method of the present invention is also applicable with various combinations of wired telephones and IP based computer telephones. Further, the cell sites (rather than the MSCs) may provide the digital wireless telephones with access to the data network. In addition, the above-described method may be modified such that the call is completed using the circuit switched network if the calling party's MSC does not receive a response message from either the called party's MSC or the called party's digital wireless telephone within a predetermined period of time.

What is claimed is:

1. A method comprising the steps of:
   determining whether a called party's audio device is able to support at least one voice compression algorithm supported by a calling party's audio device based on messages sent between said called party's audio device and said calling party's audio device via a circuit switched network;
   if said called party's audio device is able to support said at least one voice compression algorithm, (a) compressing said voice signals, at the calling party's audio device, using at least one voice compression algorithm determined to be supported by both said called party's audio device and said calling party's audio device over a data network;
   (b) sending said compressed voice signals to said called party's audio device from said calling party's audio device via said data network; and
   (c) decompressing said compressed voice signals using said supported voice compression algorithm at said called party's audio device; and
   if the calling party's audio device and the called party's audio device use incompatible voice compression algorithms, maintaining the call on the circuit switched network.

2. The method of claim 1, wherein said messages are modified circuit control signaling messages.

3. The method of claim 1, wherein each of said audio devices is one of a wired telephone, a wireless telephone, and an Internet protocol (IP) based computer telephone.

4. The method of claim 1, wherein said data network is an Internet protocol (IP) network.

5. A method of setting up a voice call between two digital wireless telephones, comprising:
   receiving, at a switch in a communication network, a call setup request from a calling digital wireless telephone, wherein the communication network is a circuit switched network;
   determining, prior to completing the call setup between the calling digital wireless telephone and a called digital wireless telephone, whether the called wireless digital telephone uses a voice compression algorithm that is compatible with a voice compression algorithm used by the calling digital wireless telephone;
   if the called digital wireless telephone and the calling digital wireless telephone use incompatible voice compression algorithms, setting up the voice call over the communication network;
   if the called digital wireless telephone and the calling digital wireless telephone use compatible voice compression algorithms, (a) setting up the voice call over the Internet; and
   (b) exchanging compressed voice signals between the calling digital wireless telephone and the called digital wireless telephone during the voice call over the Internet, wherein the voice signals are compressed using the compatible voice compression algorithm at either the calling digital wireless telephone or the called digital wireless telephone.

6. The method of claim 5 wherein the circuit switched network is a public switched telephone network.

7. A method of choosing a call setup in a communication system, comprising:
   receiving a request from a calling telephone for call setup on a circuit switched network to a called telephone;
   determining whether the calling telephone and the called telephone support compatible voice compression algorithms;
   if the calling telephone and the called telephone use incompatible voice compression algorithms, maintaining the call from the calling telephone to the called telephone on the circuit switched network; and
   if the called telephone supports a voice compression algorithm that is compatible with a voice compression algorithm supported by the calling telephone, (a) diverting the call from the circuit switched network to a data network; and
   (b) exchanging voice signals, over the data network, compressed at either the calling telephone or the called telephone, wherein the compression of the voice signals is performed using the compatible voice compression algorithm.

8. The method of claim 7, further comprising:
   determining whether the calling telephone and the called telephone have access to the same data network.

9. The method of claim 8, wherein the data network is the Internet.

10. The method of claim 7, wherein the data network is the Internet.

11. A method comprising:
   initiating a call setup between a calling party's audio device and a called party's audio device using a first path, wherein the first path includes a public switched telephone network;
   before the call setup is completed, determining whether the called party's audio device supports a voice compression algorithm compatible with a voice compression algorithm supported by the calling party's audio device;
   if the calling party's audio device and the called party's audio use compatible voice compression algorithms, completing the call setup using a second path different from the first path, wherein the second path includes a data network; and
   if the calling party's audio device and the called party's audio device use incompatible voice compression algorithms, maintaining the call from the calling party's audio device to the called party's audio device on the first path.

12. The method of claim 11, further comprising:
   based on the determination, completing the call setup on the first path.

13. A method comprising:
   sending call setup signals via a circuit-switched network to set up a call between a calling party's telephone and a called party's telephone;
   consulting information relating to compatibility of respective voice compression algorithms supported by the calling party's telephone and the called party's telephone, wherein the information is included in a request issued by the calling party's telephone and in a response to the request from the called party's telephone; and
   based on the consultation of the information that indicates that the calling party's telephone and the called party's telephone both support a compatible voice compression algorithm, sending call setup signals via a data network to complete the call setup, otherwise complete the call setup by continuing to send call setup signals via the circuit-switched network.

14. The method of claim 13, wherein the information further relates to whether both the calling party's telephone and the called party's telephone have access to the data network.

15. The method of claim 13, wherein the information is included in a network node.

16. A method comprising:
   sending a call request message to a called digital wireless telephone via a public switched telephone network as a portion of a call setup procedure, the call request message including a list of voice compression algorithms supported by a calling digital wireless telephone;
   receiving a response message indicating whether the called digital wireless telephone supports one of the voice compression algorithms on the list, and whether the called digital wireless telephone accesses a data network also accessible to the calling digital wireless telephone;
   if the response message indicates that the called digital wireless telephone support one of the voice compression algorithms on the list and that the called digital wireless telephone accesses the data network, completing the call setup procedure via the data network and sending data compressed according to the listed voice compression algorithm from the calling digital wireless telephone to the called digital wireless telephone; and
   if the response message indicates that the called digital wireless telephone does not support one of the voice compression algorithms on the list or that the called digital wireless telephone does not access the data network, completing the call setup procedure via the public switched telephone network.

17. The method of claim 16, wherein the data network is the Internet.

18. A method comprising:
   performing a phase of a call setup procedure using a communication path that includes a mobile switching center (MSC) coupled to a data network and a public switched telephone network (PSTN), the phase including sending a call request message received from a calling digital wireless telephone at the MSC to a called digital wireless telephone via the PSTN, the call request message including a list of voice compression algorithms supported by the calling digital wireless telephone;
   determining, based on a response message from the called digital wireless telephone, whether the called digital wireless telephone supports one of the voice compression algorithms on the list and whether the called digital wireless telephone has access to the data network;
   if the called digital wireless telephone supports one of the voice compression algorithms on the list and has access to the data network, completing the call setup procedure via the data network;
   if the called digital wireless telephone does not support one of the voice compression algorithms on the list or does not have access to the data network, completing the call setup procedure via the PSTN; and
   exchanging compressed voice signals between the calling digital wireless telephone and the called digital wireless telephone, wherein the voice signals are compressed according the supported voice compression algorithm by either the calling digital telephone and the called digital telephone.

19. The method of claim 18, wherein the data network is the Internet.

20. A method for diverting an Integrated Services Digital Network User Part (ISUP) network talkpath to a data network talkpath, comprising the steps of:
   determining, using an ISUP signaling path, whether a called party's telephone is configured to exchange voice signals via a same data network to which a calling party's telephone is adapted to exchange voice signals using a voice compression algorithm compatible with both the calling party's telephone and the called party's telephone, said ISUP signaling path being established during a process of establishing the ISUP network talkpath;
   establishing the data network talkpath using resources associated with said same data network if said called party's telephone is configured to exchange compressed voice signals between said calling party's telephone and said called party's telephone via said same data network using the compatible voice compression algorithm;
   exchanging voice signals between said called party's telephone and said calling party's telephone using the data network talkpath; and
   otherwise, using the ISUP network talkpath if neither the called party's telephone and the calling party's telephone are adapted to exchange voice signals using a voice compression algorithm compatible with both the calling party's telephone and the called party's telephone.

21. The method of claim 1, further comprising:
   assigning, by a mobile switching center, an IP address and port number pair to each of the voice compression algorithms.

22. The method of claim 1, further comprising:
   assigning, by a calling party's audio device, an IP address and port number pair to each of the voice compression algorithms; and
   including the assigned IP address and port number pair in a request message sent to set up a call between the calling party's audio device and the called party's audio device.

* * * * *